(12) United States Patent
Qin et al.

(10) Patent No.: US 11,250,781 B2
(45) Date of Patent: Feb. 15, 2022

(54) TOUCH OLED DISPLAY DEVICE, PIXEL CIRCUIT THEREOF AND PIXEL DRIVING METHOD

(71) Applicant: BOE TECHNOLOGY GROUP CO., LTD., Beijing (CN)

(72) Inventors: Wei Qin, Beijing (CN); Zhiqiang Xu, Beijing (CN); Xiaolong Li, Beijing (CN); Tieshi Wang, Beijing (CN); Weixing Liu, Beijing (CN); Kai Guo, Beijing (CN); Jintao Peng, Beijing (CN); Yanan Niu, Beijing (CN); Kuanjun Peng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/829,407

(22) Filed: Mar. 25, 2020

(65) Prior Publication Data

US 2021/0027711 A1   Jan. 28, 2021

(30) Foreign Application Priority Data

Jul. 25, 2019   (CN) .......................... 201910678810.5

(51) Int. Cl.
*G09G 3/3258* (2016.01)
*G06F 3/044* (2006.01)
(Continued)

(52) U.S. Cl.
CPC ......... *G09G 3/3258* (2013.01); *G06F 3/0412* (2013.01); *G06F 3/0446* (2019.05);
(Continued)

(58) Field of Classification Search
CPC .. G09G 3/3208; G09G 3/3225; G09G 3/3233; G09G 3/3258; G09G 3/3283;
(Continued)

(56) References Cited

U.S. PATENT DOCUMENTS

| 2014/0145996 | A1* | 5/2014 | Sugita | G06F 3/0412 |
| | | | | 345/173 |
| 2014/0267132 | A1* | 9/2014 | Rabii | G06F 3/04182 |
| | | | | 345/174 |

(Continued)

FOREIGN PATENT DOCUMENTS

| CN | 107492343 | 12/2017 |
| CN | 109117733 | 1/2019 |
| CN | 109388273 | 2/2019 |
| CN | 109559679 | 4/2019 |
| CN | 109935183 | 6/2019 |

OTHER PUBLICATIONS

Office action from Chinese Application No. 201910678810.5 dated Jun. 3, 2020.

*Primary Examiner* — Kenneth Bukowski
(74) *Attorney, Agent, or Firm* — Calfee, Halter & Griswold LLP

(57) ABSTRACT

A pixel circuit includes a sensing circuit, a gray-scale control circuit and a light-emitting switch circuit; the sensing circuit is configured to charge and discharge a sensing capacitor when a sensing capacitor is formed by a touch object and an anode layer of OLED; the gray-scale control circuit is configured to control the light-emitting intensity of the OLED; the light-emitting switch circuit is configured to control the OLED to emit light.

10 Claims, 12 Drawing Sheets

(51) Int. Cl.
  *G06F 3/041* (2006.01)
  *G06K 9/00* (2006.01)
  *G09G 3/3291* (2016.01)

(52) U.S. Cl.
  CPC ......... *G06K 9/0004* (2013.01); *G09G 3/3291* (2013.01); *G09G 2310/027* (2013.01); *G09G 2320/0633* (2013.01); *G09G 2354/00* (2013.01)

(58) Field of Classification Search
  CPC ........... G09G 3/3291; G09G 2310/027; G09G 2320/0633; G09G 2354/00; G06K 9/0004; G06F 3/0412; G06F 3/044
  See application file for complete search history.

(56) References Cited

U.S. PATENT DOCUMENTS

| | | | |
|---|---|---|---|
| 2015/0130865 A1* | 5/2015 | Shim | G09G 3/3233 345/694 |
| 2016/0026290 A1* | 1/2016 | Liu | G06F 3/047 345/174 |
| 2016/0216800 A1* | 7/2016 | Cho | G09G 3/3291 |
| 2017/0147121 A1* | 5/2017 | Yang | H01L 27/3246 |
| 2018/0113531 A1* | 4/2018 | Na | G06F 3/0412 |
| 2018/0181242 A1* | 6/2018 | Mizuhashi | G06F 3/0446 |
| 2018/0277037 A1* | 9/2018 | Lin | G06F 3/0412 |
| 2019/0384445 A1* | 12/2019 | Huang | G09G 3/3233 |
| 2020/0090583 A1* | 3/2020 | Cai | G09G 3/3225 |
| 2020/0144334 A1* | 5/2020 | Jang | H01L 27/3262 |

\* cited by examiner

TOUCH OLED DISPLAY DEVICE, PIXEL CIRCUIT THEREOF AND PIXEL DRIVING METHOD

CROSS-REFERENCE TO RELATED APPLICATIONS

This application is based upon and claims priority to Chinese Patent Application No. 201910678810.5, filed Jul. 25, 2019, the entire contents of which are incorporated herein by reference.

TECHNICAL FIELD

The present application relates to the technical field of a pixel circuit, and more particular, to a pixel circuit, a display device, and a pixel driving method.

BACKGROUND

With the continuous improvement of living standards, various terminal devices have become necessities in life, and user requirements for terminal devices have become higher and higher. For security, because fingerprints have individual unique characteristics, which makes fingerprint recognition have excellent privacy protection functions, fingerprint recognition is widely used in various terminal devices to increase user experience and security.

Currently, fingerprint recognition technology has become one of the important functions of electronic products, and this function has been concerned by many electronic manufacturers and applied to their electronic products.

However, the fingerprint recognition sensors are all designed and manufactured by chip technology, and an additional film layer for fingerprint recognition needs to be attached. Generally, the sensing area is small and the user experience is poor.

SUMMARY

The purpose of the present application is to provide a pixel circuit, a display device, and a pixel driving method.

In order to achieve the above purpose, a first aspect of the present application provides a pixel circuit configured to be disposed in a display device including an anode layer of an OLED, wherein the pixel circuit includes: a sensing circuit, a gray-scale control circuit and a light-emitting switch circuit;

the sensing circuit is configured to be electrically connected to sensor signal lines and the anode layer of the OLED, wherein when a touch object forms a sensing capacitor with the anode layer of the OLED, the sensing capacitor is continuously charged and discharged;

the gray-scale control circuit is configured to be electrically connected to data signal lines to control the light-emitting intensity of the OLED;

the light-emitting switch circuit is configured to be electrically connected to light-emitting signal lines and the anode layer 6 of the OLED to control the OLED to emit light; and the gray-scale control circuit is electrically connected to the light-emitting switch circuit, such that the gray-scale control circuit controls the light-emitting intensity of the OLED when the light-emitting switch circuit is turned on.

A second aspect of the present application further provides a display device including an array substrate, wherein the display device further includes the pixel circuit according to the first aspect, a driving circuit and a plurality of pixel units:

the sensor signal line, the data signal line, and the light-emitting signal line are all electrically connected to the driving circuit; and the driving circuit is configured to send a pulse signal through the sensor signal line for fingerprint recognition, send a light-emitting intensity signal through the data signal line, and send a light-emitting signal through the light-emitting signal line; and when the pulse signal is received, sensing the sensing capacitor formed by the touch object and the anode layer of the OLED in the pixel unit.

A third aspect of the present application further provides a pixel driving method, which is applied to the pixel circuit according to the first aspect, wherein the method includes the following steps:

in a fingerprint recognition phase, the sensing circuit is turned on, a pulse signal is received, and the sensing capacitor which is formed by the anode layer of the OLED and the touch object is continuously charged and discharged;

in a light-emitting intensity control phase, a light-emitting intensity signal is received, and the light intensity signal is input to the gray-scale control circuit and stored; and in a light-emitting phase, a light-emitting signal is received, and the light-emitting switch circuit is turned on, such that the gray-scale control circuit controls the OLED to emit light according to the light-emitting intensity signal.

Additional aspects and advantages of the present application will be given in the following description, which will become apparent from the following description or be learned through the practice of the present application.

BRIEF DESCRIPTION OF THE DRAWINGS

The above and/or additional aspects and advantages of this application will become apparent and easily understood from the following description of the embodiments in conjunction with the accompanying drawings, in which.

DETAILED DESCRIPTION

Figure 1:
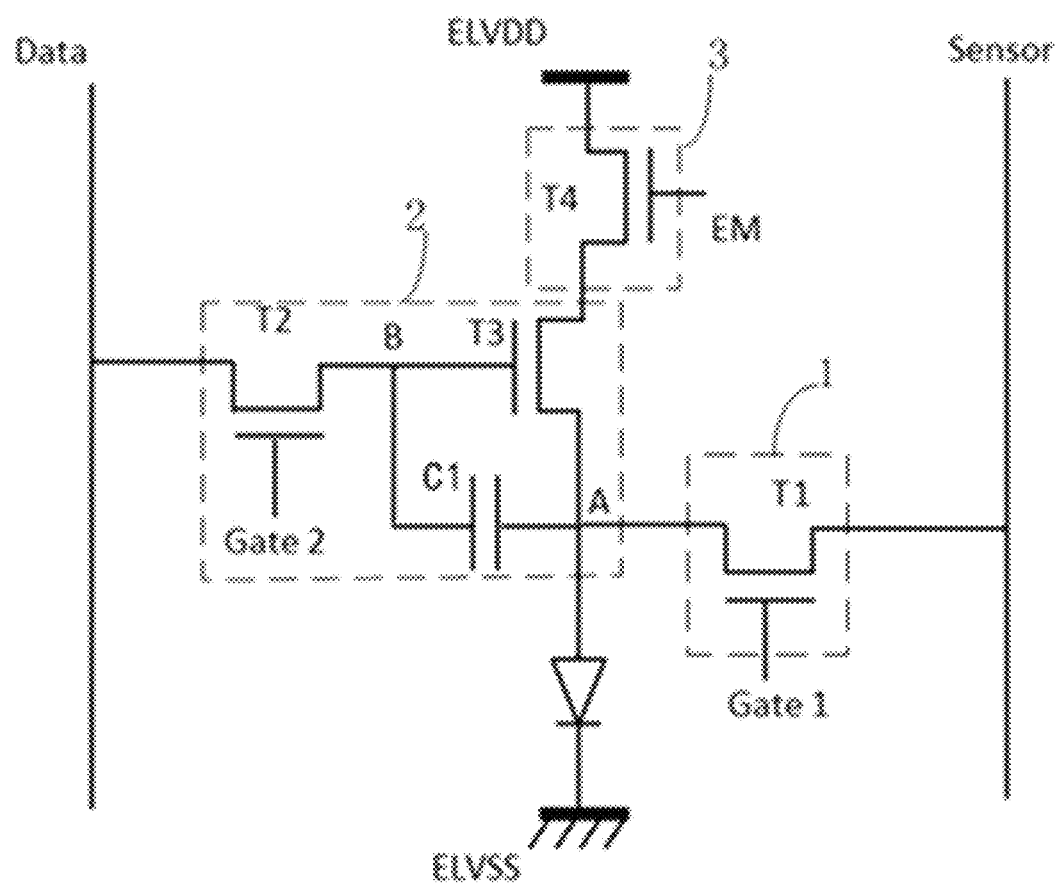
FIG. 1 is a circuit structural diagram of a pixel circuit according to Embodiment 1 of the present application.

The embodiments of the present application are described in detail below. Examples of the embodiments are shown in the drawings, wherein the same or similar reference numerals indicate the same or similar elements or elements having the same or similar functions. The embodiments described below with reference to the drawings are exemplary and are only used to explain the present application, and cannot be construed as limiting the present application.

Those skilled in the art can understand that, unless otherwise defined, all terms (including technical terms and scientific terms) used herein have the same meaning as commonly understood by those of ordinary skill in the art to which this application belongs. It should also be understood that terms such as those defined in the general dictionary should be understood to have meanings consistent with the meanings in the context of the prior art, and unless specifically defined like this, they would not be interpreted in an idealized or overly formal sense.

Those skilled in the art will understand that, unless specifically stated otherwise, the singular forms "a", "an", "the" and "the" herein may include plural forms. It should be further understood that the word "comprising" used in the specification of this application refers to the presence of the described features, integers, steps, operations, elements and/or components, but does not exclude the presence or addition of one or more other features, integers, steps, operations, elements, components, and/or groups thereof. As used herein, the term "and/or" includes all or any of the elements and all combinations of one or more of the associated listed items.

The technical solutions of the present application and how the technical solutions of the present application solve the foregoing technical problems will be described below with specific embodiments. The following specific embodiments may be combined with each other, and the same or similar concepts or processes may not be repeated in some embodiments. The embodiments of the present application will be described below with reference to the drawings.

Referring to FIGS. 1 to 8, an embodiment of the present application provides a pixel circuit configured to be disposed in an OLED (Organic Light-Emitting Diode) display device. The pixel circuit includes: a sensing circuit 1, a gray-scale control circuit 2 and a light-emitting switch circuit 3.

The sensing circuit 1 is configured to be electrically connected to sensor signal lines 10 and an anode layer 6 of the OLED, wherein when a touch object forms a sensing capacitor with the anode layer 6 of the OLED, the sensing capacitor is continuously charged and discharged;

the gray-scale control circuit 2 is configured to be electrically connected to data signal lines 9 to control the light-emitting intensity of the OLED; and the light-emitting switch circuit 3 is configured to be electrically connected to light-emitting signal lines 12 and the anode layer 6 of the OLED to control the OLED to emit light.

The gray-scale control circuit 2 is electrically connected to the light-emitting switch circuit 3, such that the gray-scale control circuit 2 controls the light-emitting intensity of the OLED when the light-emitting switch circuit 3 controls the OLED to emit light.

Based on the fact that traditional touch screen manufacturers do not have high-precision equipment for the production of fingerprint recognition sensors, wherein fingerprint recognition sensors need a density of more than 300 sensing terminals per inch, and the density of touch is much less than this density. However, the applicant found that a display screen of the display device produced by display device manufacturers may generally reach 300 ppi or more (300 pixels per inch). Considering that one pixel has 3 sub-pixels, the requirement for density of fingerprint recognition can be achieved by the display device manufacturers.

In the present application, the anode layer of the OLED of the display device is electrically connected with the pixel circuit. When the touch object contacts the display screen of the display device, the anode layer of the OLED and the touch object form the sensing capacitor. The touch object has a fingerprint, and fingerprint recognition is achieved by the sensing capacitor. Subsequently, the gray-scale control circuit 2 receives the light intensity signal to control the light-emitting intensity of the OLED. Then, the light-emitting switch circuit 3 receives the light-emitting signal, and the OLED emits light, thereby completing fingerprint recognition. The application realizes the function of embedded fingerprint recognition, realizes a display device with full-screen fingerprint recognition, increases the sensing area of fingerprint recognition, and does not need to attach an additional fingerprint recognition film layer, so that the thinness and lightness of the full-screen fingerprint recognition screen are achieved and the user experience is improved.

In some embodiments, a first terminal, a second terminal, and a third terminal of the sensing circuit 1 are electrically connected to an (n−1)-th gate signal line, the sensor signal lines 10, and the anode layer 6 of the OLED, respectively; and n is an integer, and n>1, a cathode layer 8 of the OLED is electrically connected to a first voltage terminal;

a first terminal and a second terminal of the gray-scale control circuit 2 are electrically connected to an n-th gate signal line and the data signal lines 9, respectively; and if the sensor signal lines 10 send a pulse signal and an initialization signal at intervals, both a third terminal and a fifth terminal of the gray-scale control circuit 2 are electrically connected to a first node A; both the anode layer 6 of the OLED and the third terminal of the sensing circuit 1 are electrically connected to the first node A.

If the sensor signal lines 10 send the pulse signal and the initialization signal lines send the initialization signal, the third terminal of the gray-scale control circuit 2 is electrically connected to the anode layer 6 of the OLED, and the fifth terminal of the gray-scale control circuit 2 is connected to the initialization signal lines.

A first terminal of the light-emitting switch circuit 3 is electrically connected to the light-emitting signal lines 12; and a second and a third terminal of the light-emitting switch circuit 3 are electrically connected to a fourth terminal of the gray-scale control circuit 2 and a second voltage terminal, respectively.

Figure 2:
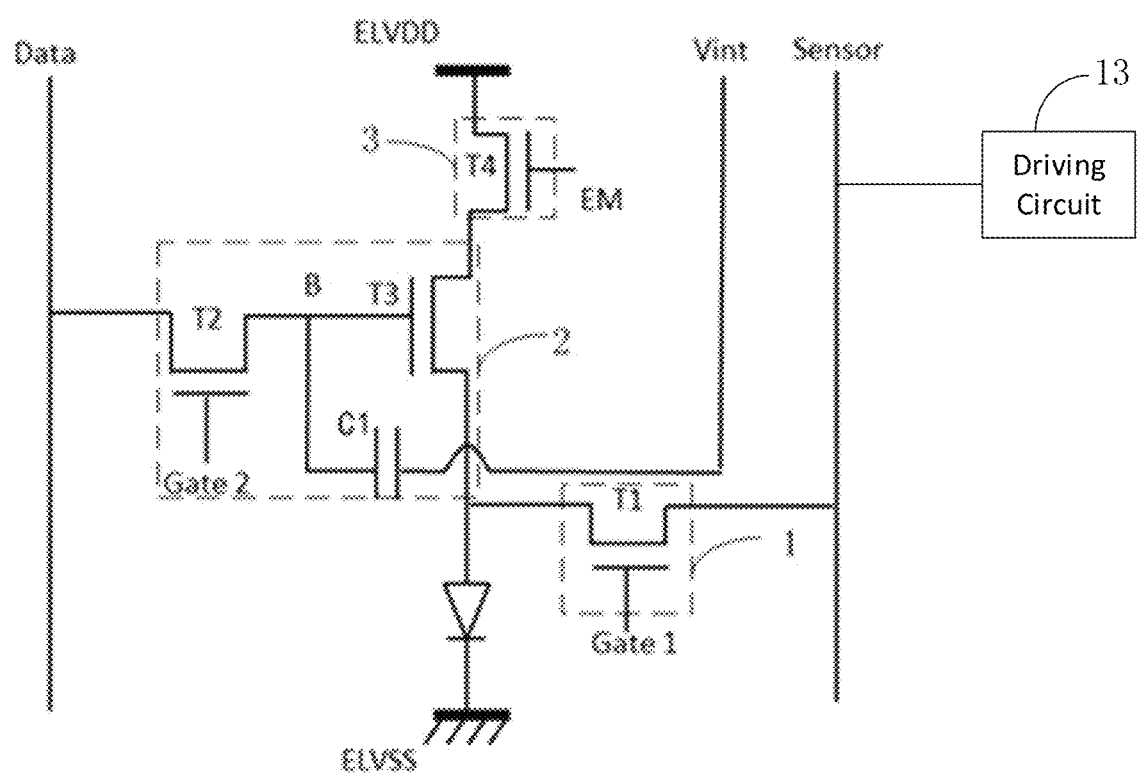
FIG. 2 is a circuit structural diagram of a pixel circuit according to Embodiment 2 of the present application.

Referring to FIGS. 1 and 2, the pixel circuit of the technical solution of the present application will be described in detail with specific Embodiments 1 and 2. In these two embodiments 1 and 2, n=2, the first terminal of the sensing circuit 1 is electrically connected to the first gate signal line Gate 1, and the first terminal of the gray-scale control circuit 2 is electrically connected to the second gate signal line Gate 2. Data indicates the data signal line (Data Line) 9, and Sensor indicates the sensor signal line (Sensor Line) 10; EM indicates the light-emitting signal line (EMit) 12; and ELVSS (electroluminescent low voltage) indicates the first voltage terminal, and ELVDD (electroluminescent high voltage) indicates the second voltage terminal.

Embodiment 1

Figure 7:
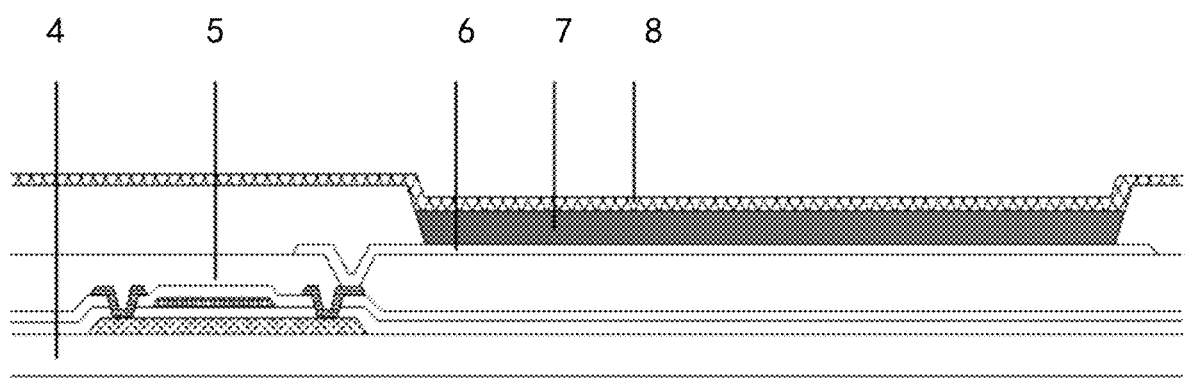
FIG. 7 is a cross-sectional view of a display device according to an embodiment of the present application.
Figure 8:
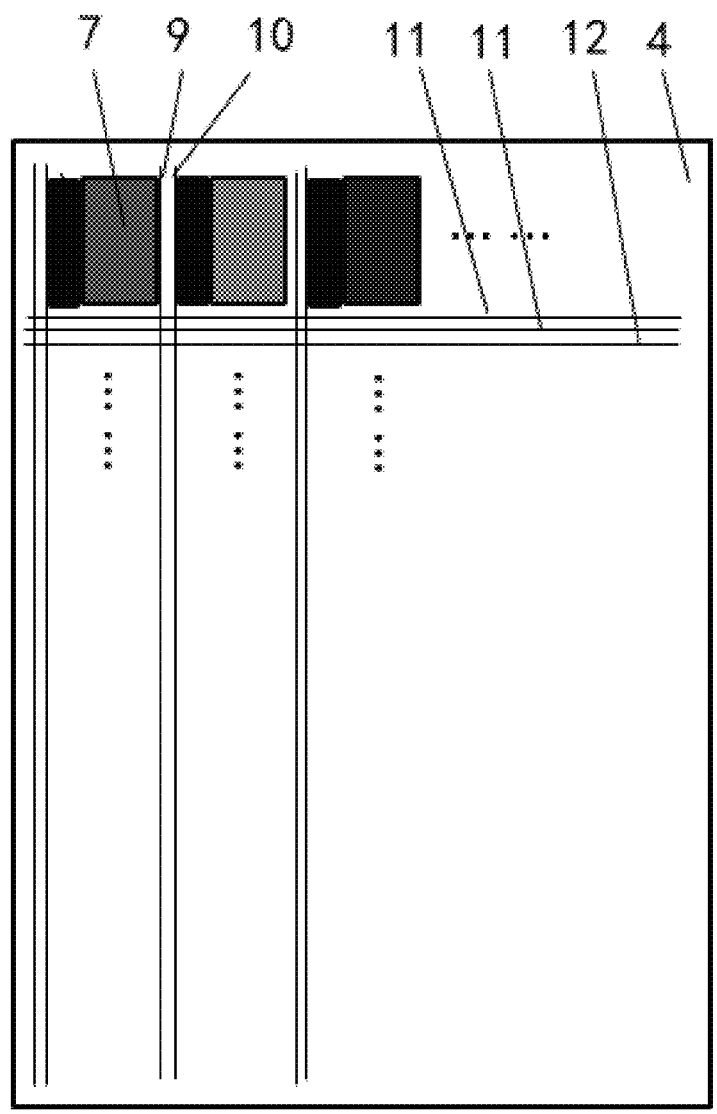
FIG. 8 is a schematic structural diagram of a portion inside a display device according to an embodiment of the present application.

Referring to FIGS. 1, 7, and 8, an embodiment of a circuit structure of the pixel circuit is provided. The sensor signal lines 10 send the pulse signal and the initialization signal at intervals, both the third terminal and the fifth terminal of the gray-scale control circuit 2 are electrically connected to the first node A; both the anode layer 6 of the OLED and the third terminal of the sensing circuit 1 are electrically connected to the first node A. The first terminal of the sensing circuit 1 is electrically connected to the first gate signal line Gate 1, and the first terminal of the gray-scale control circuit 2 is electrically connected to the second gate signal line Gate 2. In this embodiment, Data indicates the data signal line (Data Line) 9, and Sensor indicates the sensor signal line (Sensor Line) 10; and EM indicates the light-emitting signal line (EMit) 12.

Optionally, the sensing circuit 1 includes a first switching device T1;

a control electrode of the first switching device T1 is used as the first terminal of the sensing circuit 1;

a first electrode and a second electrode of the first switching device T1 are used as the second and third terminals of the sensing circuit 1, respectively; and the first electrode of the first switching device T1 is externally connected to a driving circuit 13 through the sensor signal line 10; and the driving circuit 13 is used to continuously send the pulse signal to the sensing capacitor formed by the anode layer 6 of the OLED and the touch object through the sensor signal line 10 when the first switching device T1 is turned on.

Optionally, the gray-scale control circuit 2 includes a second switching device T2, a third switching device T3, and a first charge storage device C1;

a control electrode and a first electrode of the second switching device T2 are used as the first and second terminals of the gray-scale control circuit 2, respectively;

a second electrode of the second switching device T2 is electrically connected to a second node B;

a first electrode of the third switching device T3 is used as the fourth terminal of the gray-scale control circuit 2;

a control electrode of the third switching device T3 is electrically connected to the second node B;

one terminal of the first charge storage device C1 is electrically connected to the second node B; and a second electrode of the third switching device T3 is used as the third terminal of the gray-scale control circuit 2, and the other terminal of the first charge storage device C1 is used as the fifth terminal of the gray-scale control circuit 2. Optionally, the first charge storage device C1 is a capacitor.

Optionally, the light-emitting switch circuit 3 includes a fourth switching device T4;

a control electrode of the fourth switching device T4 is used as the first terminal of the light-emitting switch circuit 3;

a first electrode and a second electrode of the fourth switching device T4 are used as the second terminal and the third terminal of the light emitting switch circuit 3, respectively.

Optionally, referring to FIG. 7, if the first electrode of the switching device is a source electrode of a thin film transistor 5, the second electrode of the switching device is a drain electrode of the thin film transistor 5; and if the first electrode of the switching device is the drain electrode of the thin film transistor 5, the second electrode of the switching device is the source electrode of the thin film transistor 5.

Embodiment 2

Referring to FIGS. 2, 7, and 8, the difference between Embodiment 2 and Embodiment 1 is that the sensor signal line 10 sends the pulse signal and the initialization signal line sends the initialization signal, the third terminal of the gray-scale control circuit 2 is electrically connected to the anode layer 6 of the OLED, and the fifth terminal of the gray-scale control circuit 2 is connected to the initialization signal line. In this embodiment, Data indicates the data signal line (Data Line) 9, and Sensor indicates the sensor signal line (Sensor Line) 10; and Vint indicates the initialization signal line (Vint Line).

Correspondingly, the second electrode of the third switching device T3 is used as the third terminal of the gray-scale control circuit 2 and is electrically connected to the anode layer 6 of the OLED; and the other terminal of the first charge storage device C1 is used as the fifth terminal of the gray-scale control circuit 2, and is electrically connected to the initialization signal line.

In other embodiments, referring to FIGS. 3 to 8, a first terminal of the sensing circuit 1 is electrically connected to an n-th gate signal line or an n-th pulse signal line;

a second terminal and a third terminal of the sensing circuit 1 are electrically connected to the sensor signal line 10 and the anode layer 6 of the OLED, respectively; and n is an integer, and n>1;

a cathode layer 8 of the OLED is electrically connected to a first voltage terminal;

a first terminal and a second terminal of the gray-scale control circuit 2 are electrically connected to the n-th gate signal line and the data signal line 9, respectively;

if the sensor signal line 10 sends a pulse signal and an initialization signal at intervals, a third terminal of the gray-scale control circuit 2 is electrically connected to the third node C; and the third node C is electrically connected to the second terminal of the sensing circuit 1 and the sensor signal line 10;

if the sensor signal line 10 sends the pulse signal and the initialization signal line sends the initialization signal, the third terminal of the gray-scale control circuit 2 is electrically connected to the initialization signal line;

a fourth terminal of the gray-scale control circuit 2 is electrically connected to an (n−1)-th gate signal line;

a fifth terminal of the gray-scale control circuit 2 is electrically connected to a second voltage terminal;

a first terminal of the light-emitting switch circuit 3 is electrically connected to a light-emitting signal line 12;

a second terminal, a third terminal, and a fourth terminal of the light-emitting switch circuit 3 are electrically connected to a sixth terminal and a seventh terminal of the gray-scale control circuit 2 and the second voltage terminal, respectively; and a fifth terminal of the light-emitting switch circuit 3 is electrically connected to the anode layer 6 of the OLED.

The pixel circuit of the technical solution of the present application will be described in detail with the following four embodiments.

Embodiment 3

Figure 3:
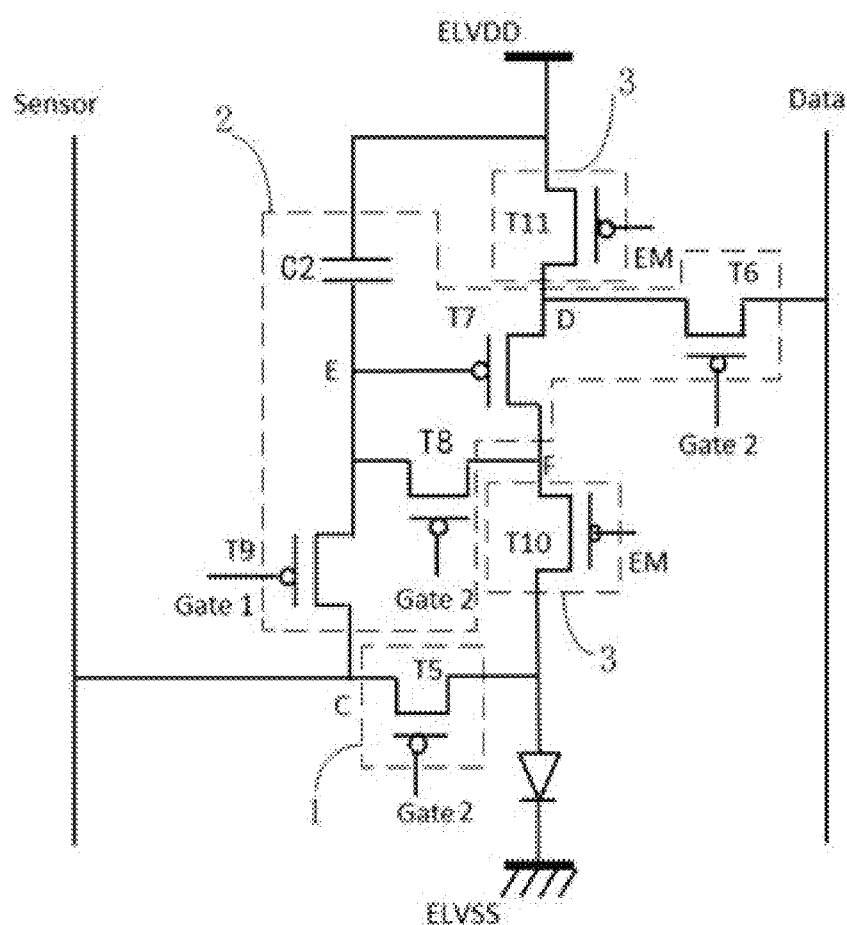
FIG. 3 is a circuit structural diagram of a pixel circuit according to Embodiment 3 of the present application.

Referring to FIGS. 3, 7, and 8, an embodiment of a circuit structure of the pixel circuit is provided. The sensor signal line 10 sends the pulse signal and the initialization signal at intervals, the third terminal of the gray-scale control circuit 2 is electrically connected to the third node C; and the third node C is electrically connected to the second terminal of the sensing circuit 1 and the sensor signal line 10.

In this embodiment, n=2, the first terminal of the sensing circuit 1 is electrically connected to the second gate signal line, the first terminal of the gray-scale control circuit 2 is electrically connected to the second gate signal line, and the fourth terminal of the gray-scale control circuit 2 is electrically connected to the first gate signal line. The sensing circuit 1 and the gray-scale control circuit 2 may work in the same time period In this embodiment, Data indicates the data signal line (Data Line) 9, and Sensor indicates the sensor signal line (Sensor Line) 10

Optionally, the sensing circuit 1 includes a fifth switching device T5;

a control electrode of the fifth switching device T5 is used as the first terminal of the sensing circuit 1;

a first electrode and a second electrode of the fifth switching device T5 are used as the second terminal and the third terminal of the sensing circuit 1, respectively.

Optionally, the gray-scale control circuit 2 includes a sixth switching device T6, a seventh switching device T7, an eighth switching device T8, a ninth switching device T9, and a second charge storage device;

control electrodes of the sixth switching device T6 and the eighth switching device T8 are commonly used as the first terminal of the gray-scale control circuit 2;

a first electrode of the sixth switching device T6 is used as the second terminal of the gray-scale control circuit 2;

a second electrode of the sixth switching device T6 is electrically connected to a fourth node D;

a control electrode and a first electrode of the ninth switching device T9 are used as the fourth terminal of the gray-scale control circuit 2 and the third terminal of the gray-scale control circuit 2, respectively;

a second electrode of the ninth switching device T9 is electrically connected to a fifth node E;

a control electrode, a first electrode, and a second electrode of the seventh switching device T7 are electrically connected to the fifth node E, the fourth node D, and a sixth node F, respectively;

a first electrode and a second electrode of the eighth switching device T8 are electrically connected to the fifth node E and the sixth node F, respectively;

the fourth node D and the sixth node F are commonly used as the sixth terminal and the seventh terminal of the gray-scale control circuit 2, respectively;

a first terminal of the second charge storage device C2 is used as the fifth terminal of the gray-scale control circuit 2; and a second terminal of the second charge storage device C2 is electrically connected to the fifth node E. Optionally, the second charge storage device C2 is a capacitor.

Optionally, the light-emitting switch circuit 3 includes a tenth switching device T10 and an eleventh switching device T11;

a control electrode of the tenth switching device T10 and a control electrode of the eleventh switching device T11 are commonly used as the first terminal of the light-emitting switch circuit 3;

a first electrode of the tenth switching device T10 and a second electrode of the eleventh switching device T11 are used as the third terminal and the second terminal of the light-emitting switch circuit 3, respectively;

the first electrode of the tenth switching device T10 is electrically connected to the sixth node F, and the second electrode of the eleventh switching device T11 is electrically connected to the fourth node D;

a first electrode of the eleventh switching device T11 is used as the fourth terminal of the light-emitting switch circuit 3; and a second electrode of the tenth switching device T10 is used as the fifth terminal of the light emitting switch circuit 3.

Optionally, each switching device is a thin film transistor 5, and the control electrode of any of the switching devices is a gate electrode of the thin film transistor 5;

a first electrode of the switching device serves as a source electrode or a drain electrode of the thin film transistor 5; and correspondingly, a second electrode of the switching device is the drain electrode or source electrode of the thin film transistor 5.

Embodiment 4

Figure 4:
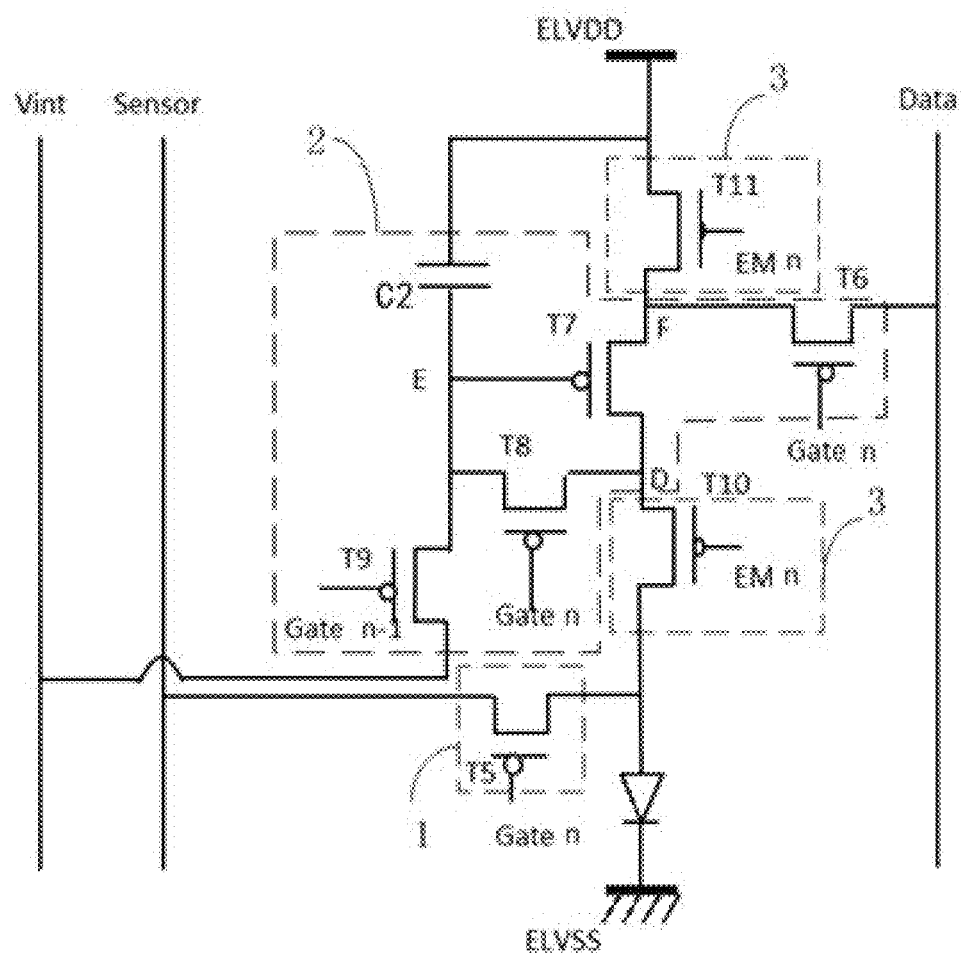
FIG. 4 is a circuit structural diagram of a pixel circuit according to Embodiment 4 of the present application.

Referring to FIGS. 4, 7, and 8, the main difference between Embodiment 4 and Embodiment 3 is that: the sensor signal line 10 sends the pulse signal and the initialization signal line sends the initialization signal, the third terminal of the gray-scale control circuit 2 is electrically connected to the anode layer 6 of the OLED, and the fifth terminal of the gray-scale control circuit 2 is connected to the initialization signal line.

In this embodiment, the first end of the sensing circuit 1 is electrically connected to the n-th gate signal line; the first end of the gray-scale control circuit 2 is electrically connected to the n-th gate signal line; the fourth end of the gray-scale control circuit 2 is electrically connected to the (n−1)-th gate signal line; Data indicates the data signal line (Data Line) 9, Sensor indicates the sensor signal line (Sensor Line) 10, and Vint indicates the initialization signal line (Vint Line).

Correspondingly, the second electrode of the third switching device T3 is used as the third terminal of the gray-scale control circuit 2 and is electrically connected to the anode layer 6 of the OLED; and the other terminal of the first charge storage device is used as the fifth terminal of the gray-scale control circuit 2, and is electrically connected to the initialization signal line.

Embodiment 5

Figure 5:
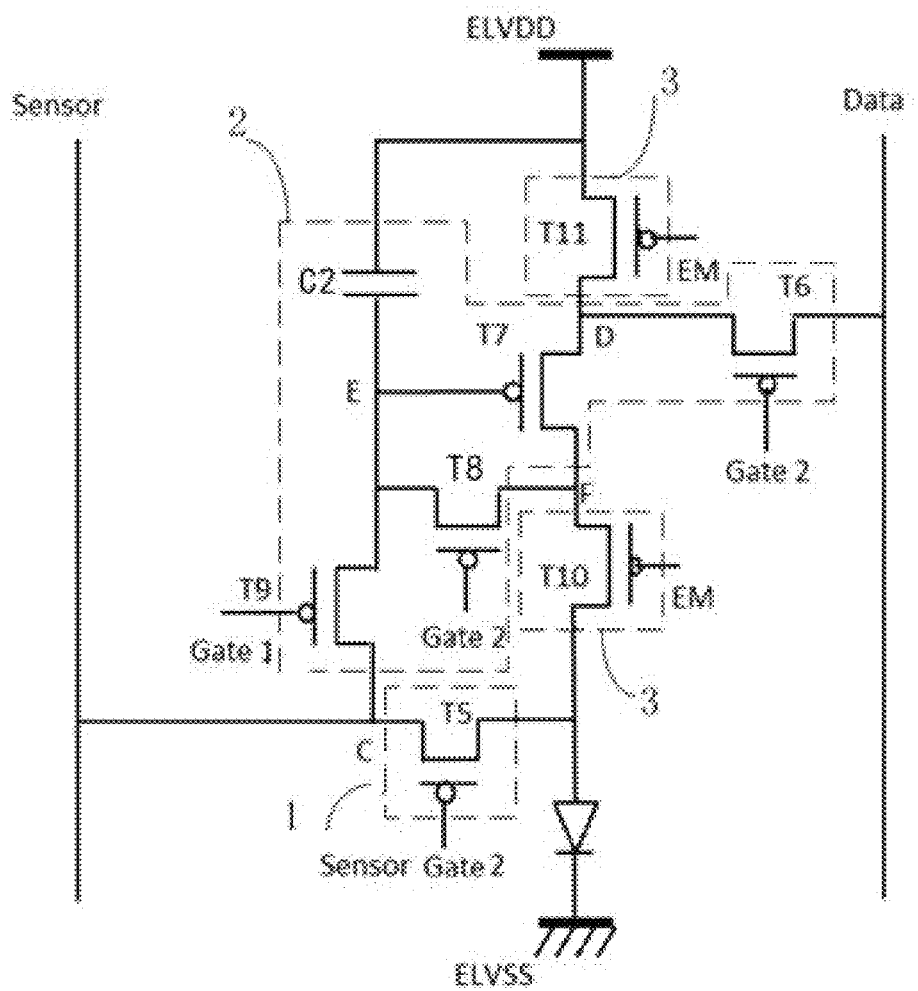
FIG. 5 is a circuit structural diagram of a pixel circuit according to Embodiment 5 of the present application.

Referring to FIG. 5, the difference between Embodiment 5 and Embodiment 3 is that: the first terminal of the sensing circuit 1 is electrically connected to the n-th pulse signal line (Sensor Gate n); in this embodiment, n=2, the first terminal of the sensing circuit 1 is electrically connected to the second pulse signal line (Sensor Gate 2), Data indicates the data signal line (Data Line) 9, and Sensor indicates the sensor signal line (Sensor Line) 10.

Based on the above connection manner, the sensing circuit 1 and the gray-scale control circuit 2 may respectively perform signal input, and the first terminal of sensing circuit 1 and the first terminal of the gray-scale control circuit 2 are not connected to the same signal line.

Embodiment 6

Figure 6:
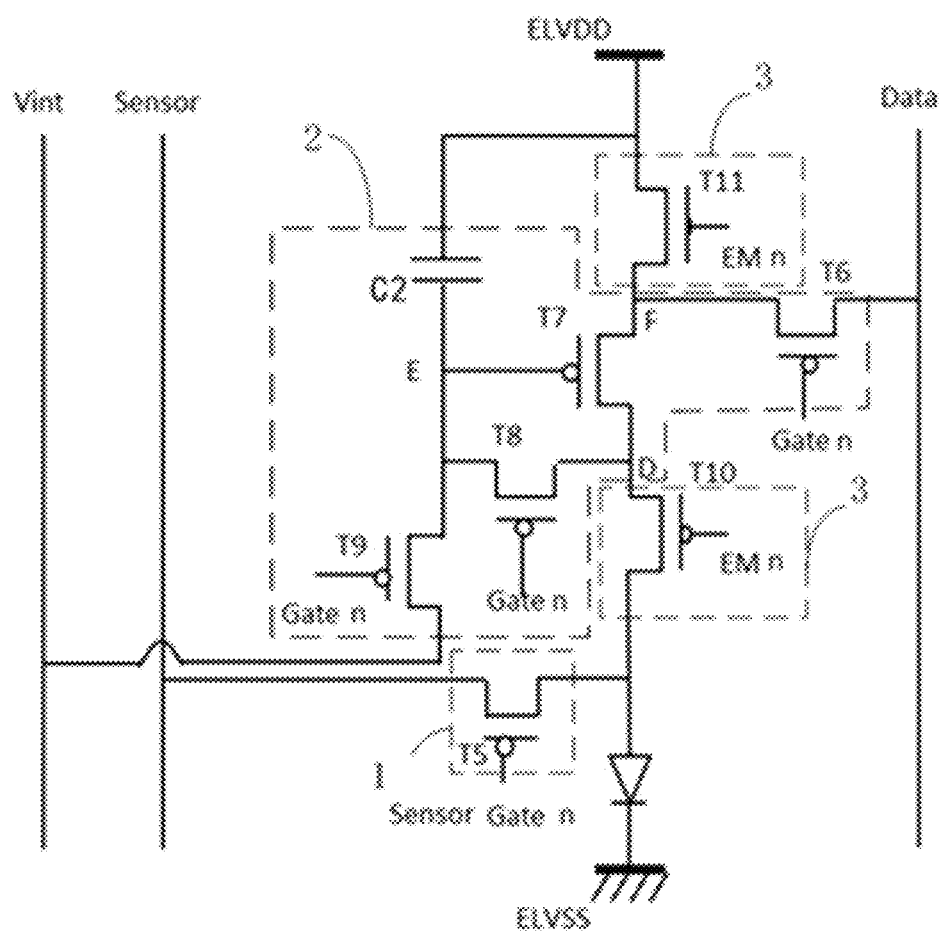
FIG. 6 is a circuit structural diagram of a pixel circuit according to Embodiment 6 of the present application.

Referring to FIG. 6, the difference between Embodiment 6 and Embodiment 4 is similar to the difference between Embodiment 5 and Embodiment 3. In this embodiment, the first terminal of the sensing circuit 1 is electrically connected to the n-th pulse signal line (Sensor Gate n), the first terminal of the gray-scale control circuit 2 is electrically connected to the n-th gate signal line (Gate n), and the fourth terminal of the gray-scale control circuit 2 is electrically connected to the (n−1)-th gate signal line. Data indicates the data signal line (Data Line) 9, Sensor indicates the sensor signal line (Sensor Line) 10, and Vint indicates the initialization signal line (Vint Line).

Therefore, the first terminal of the sensing circuit 1 and the first terminal of the gray-scale control circuit 2 are connected to different signal lines, and the sensing circuit 1 and the gray-scale control circuit 2 may perform signal input, respectively.

Based on the same inventive concept, an embodiment of the present application further provides a display device including an array substrate, and further including the above pixel circuit, a driving circuit, and a plurality of pixel units;

the sensor signal line 10, the data signal line 9, and the light-emitting signal line 12 are all electrically connected to the driving circuit;

the driving circuit is configured to send a pulse signal through the sensor signal line 10 for fingerprint recognition, send a light-emitting intensity signal through the data signal line 9, and send a light-emitting signal through the light-emitting signal line 12; and when the pulse signal is received, sensing the sensing capacitor formed by the touch object and the anode layer of the OLED in the pixel unit.

Referring to FIG. 7, a cross-sectional view of a display device is provided. The display device includes a substrate 4, a thin film transistor 5, an anode layer 6 of an OLED, a light-emitting material 7, and a cathode layer 8 of the OLED. The display device of the present application has an embedded design for fingerprint recognition based on the existing bottom-emitting OLED display. The substrate 4 may be a glass substrate or a white PI (polyimide) substrate with a flexible folding function. Considering the sensitivity of fingerprint recognition, its thickness is set to 0.1 mm~0.7 mm (millimeter), including two end values of 0.1 mm and 0.7 mm.

On the substrate 4, the following layers are sequentially formed and patterned: a polysilicon layer, a gate insulating layer, a gate metal layer, a spacer layer, and source electrode and drain electrode metal layers, thereby forming the polysilicon thin film transistor 5. At the same time, the pixel circuit connected with different transistors is formed, and then covered by a protective layer. The anode layer 6 of the OLED is then formed and patterned. The anode layer 6 of the OLED may be made of a transparent conductive material such as ITO (Indium tin oxide, an N-type oxide semiconductor-indium tin oxide). The above film formation process is: the anode layer 6 of the OLED is deposited by a magnetron sputter (Sputter) method, or the anode layer 6 of the OLED is produced by a chemical vapor deposition (CVD) method, a photolithography process, an etching process, and the like. That is, the patterning is performed through exposure and development in photolithography, etching, peeling, cleaning and other process steps.

Then, light-emitting material 7 is deposited to form a light-emitting layer, and the material of the light-emitting layer is generally an organic material. The organic light-emitting material 7 has the characteristics of electroluminescence. The cathode layer 8 of the OLED is made of magnesium and silver, which has a reflective effect, thereby forming this device to emit light. The light-emitting manner is to apply a voltage between the anode layer 6 of the OLED and the cathode layer 8 of the OLED, such that the anode layer 6 of the OLED transports a hole stream to the organic light-emitting layer, the cathode layer 8 of the OLED transports an electron stream to the organic light-emitting layer, and electrons and holes in the organic light-emitting layer recombine and light is emitted out during the recombination process.

As shown in FIG. 8, a wiring arrangement manner on the substrate 4 of the display device of this embodiment is provided. The sensor signal lines 10, the data signal lines 9, and the light-emitting signal lines 12 are disposed on the substrate 4. Three sub-pixels are shown in the drawing, wherein the above-mentioned pixel circuit is on the left side of the light-emitting material 7 of each sub-pixel, and two gate signal lines 11 and one light-emitting signal line 12 form a group of signal lines separating rows of sub-pixels, which are arranged horizontally; and the data signal lines 9 and the sensor signal lines 10 are arranged vertically, and a group of lines containing one data signal line 9 and one sensor signal line 10 are located between the two sub-pixels.

Optionally, each of the pixel units serves as a transmitting electrode or a receiving electrode; capacitance sensing may be achieved between the receiving electrode and the transmitting electrode of adjacent pixel units.

Figure 9:
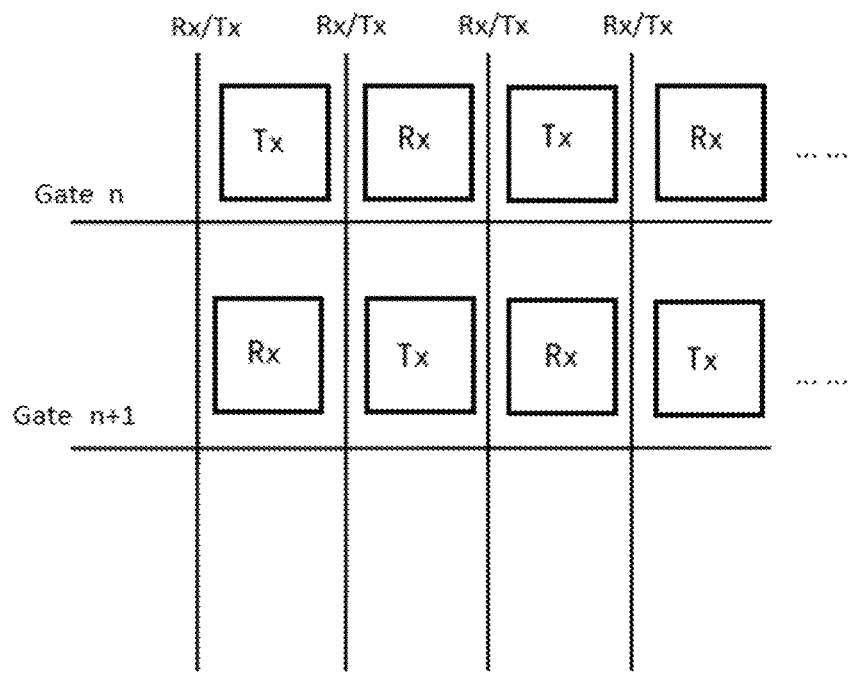
FIG. 9 is an arrangement diagram of pixel units of a display device according to an embodiment of the present application.

Referring to FIG. 9, an embodiment of a pixel unit arrangement is provided. Among adjacent pixel units, one row has the transmitting electrode and another row has the receiving electrode. In the drawing, Rx is a receiving electrode, Tx is a transmitting electrode, Gate n is the n-th gate signal line, and Gate n+1 is an (n+1)-th gate signal line.

Figure 10:
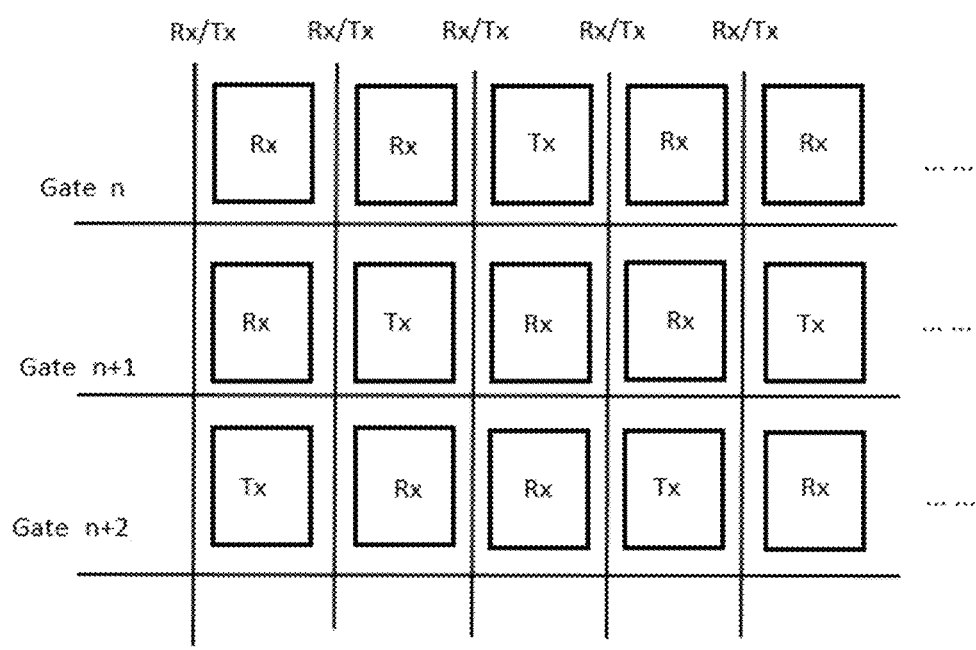
FIG. 10 is an arrangement diagram of pixel units of a display device according to another embodiment of the present application.

Referring to FIG. 10, in order to improve the sensing accuracy and increase the number of receiving electrodes, another embodiment of an arrangement of pixel units is provided. The number of receiving electrodes is twice the number of transmitting electrodes, and each transmitting electrode is surrounded by receiving electrodes. In the drawing, Rx is a receiving electrode, Tx is a transmitting electrode, Gate n is the n-th gate signal line, Gate n+1 is the (n+1)-th gate signal line, and Gate n+2 is an (n+2)-th gate signal line. It is contemplated that there are many similar arrangements of transmitting/receiving electrodes that are also applicable to the display device of the present application, and may also be driven in a self-capacitive manner In this application, the working principle of fingerprint recognition is: fingerprint recognition is achieved by mutual capacitance, that is, in a manner of line-by-line scan. When the (n−1)-th row is turned on, the mutual capacitance sensing between adjacent pixel units is realized. Then, the n-th row is turned on, that is, the anode layer of the OLED of one transmitting electrode and the touch object with a fingerprint form a capacitor, a pulse signal is received, and the capacitance formed by the anode layer of the OLED of another receiving electrode and the touch object with a fingerprint generates sensing, so that fluctuations occur, and the capacitance becomes smaller. The receiving electrode sends a feedback signal to the driving circuit, and the driving circuit may be a driving chip IC. The feedback signal indicates the amount of capacitance. The driver chip IC determines the ridge or valley of the fingerprint lines here based on the amount of capacitance. In practical applications, a capacitor may be formed between the anode layer of the OLED of the transmitting electrode and the touch object with a fingerprint, and a pulse signal is received, and then the pulse signal is sent to the receiving electrode, the receiving electrode receives a set of delayed pulse signals, and the amount of capacitance is calculated based on the delay time.

Based on the same inventive concept, an embodiment of the present application further provides a pixel driving method, which is applied to the above pixel circuit, and the method includes the following steps:

in a fingerprint recognition phase, the sensing circuit 1 is turned on, a pulse signal is received, and the sensing capacitor which is formed by the anode layer 6 of the OLED and the touch object is continuously charged and discharged;

in a light-emitting intensity control phase, a light-emitting intensity signal is received, and the light intensity signal is input to the gray-scale control circuit 2 and stored; and in a light-emitting phase, a light-emitting signal is received, and the light-emitting switch circuit 3 is turned on, such that the gray-scale control circuit 2 controls the OLED to emit light according to the light-emitting intensity signal.

Specifically, the fingerprint recognition phase may be performed before the light-emitting intensity control phase, or may be performed in parallel with the light-emitting intensity control phase, and the light-emitting phase is after the light-emitting intensity control phase.

Optionally, the method further includes an initialization phase. The gray-scale control circuit 2 receives an initialization signal and initializes the light-emitting intensity signal of the gray-scale control circuit 2.

The pixel driving method of this technical solution is described in detail with two embodiments below.

Embodiment 7

In this embodiment, the pixel driving method includes the following steps:

Initialization Phase:

both the gray-scale control circuit 2 and the light-emitting switch circuit 3 are turned off when they receive a second level signal through their respective first terminals;

the sensing circuit 1 is turned on when receiving a first level signal through the first terminal, and the second terminal of the sensing circuit 1 sends the received initialization signal to the fifth terminal of the gray-scale control circuit 2 to initialize the light-emitting intensity signal; or, the first terminal of the sensing circuit 1 receives the second level signal, the sensing circuit 1 is turned off, and the fifth terminal of the gray-scale control circuit 2 receives the initialization signal to initialize the light-emission intensity signal.

Fingerprint Recognition Phase:

both the gray-scale control circuit 2 and the light-emitting switch circuit 3 are turned off when they receive the second level signal through their respective first terminals; and the sensing circuit 1 is turned on when receiving a first level signal through the first terminal, the pulse signal received by the second terminal is output to the anode layer 6 of the OLED through the third terminal, and the sensing capacitor which is formed by the anode layer 6 of the OLED and the touch object is continuously charged and discharged;

Light-Emitting Intensity Control Phase:

the sensing circuit 1 is turned off when receiving the second level signal through the first terminal; and the light-emitting switch circuit 3 remains in the off state;

when the gray-scale control circuit 2 receives the first level signal through the first terminal, the second terminal and the fifth terminal of the gray-scale control circuit 2 are turned on; and the received light-emitting intensity signal of the data signal line 9 is transmitted to the gray-scale control circuit 2 by the second terminal of the gray-scale control circuit 2 and stored.

Light-Emitting Phase:

the sensing circuit 1 remains the off state;

the light-emitting switch circuit 3 is turned on when the first level signal is received through the first terminal;

when the gray-scale control circuit 2 receives the second level signal through the first terminal, the first terminal of the gray-scale control circuit 2 is disconnected from the second terminal, the fourth terminal and the third terminal are turned on, the driving current corresponding to the light-emitting intensity signal is transmitted to the anode layer 6 of the OLED, and the OLED emits light.

When the first level signal is high level, the second level signal is low level; and when the second level signal is low level, the first level signal is high level.

Figure 11:
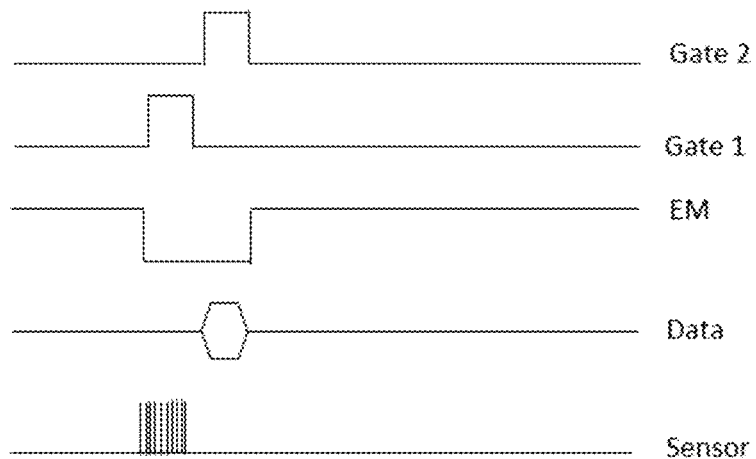
FIG. 11 is a timing diagram of a driving method of a pixel circuit according to Embodiment 1 of the present application.

In the embodiment, as shown in FIG. 11, applied to the circuit structure of the 4T1C in Embodiment 1, the drain electrode is connected to a high voltage and the source electrode is connected to a low voltage when each switching device TFT adopts N-type MOS.

The specific work process is performed according to the following sequence:

First, when the first gate signal line Gate 1 is at a high level, the first switching device T1 in the pixel circuit is turned on, and the sensor signal line 10 (Sensor Line) 10 is communicated with the anode layer 6 of the OLED through the first switching device T1, and the anode layer 6 of the OLED is used as one end of the capacitive sensing to perform fingerprint recognition detection. In this process, the sensor signal line 10 is connected to the drive circuit, and the continuous pulse signal is given to perform fingerprint recognition sensing. In this process, the light-emitting signal line EM is input low level, the fourth switching device T4 is turned off to ensure that the OLED does not emit light, and at the same time, the second gate signal line Gate2 is low level, and the second switching device T2 is turned off.

Then, the first gate signal line Gate 1 is input low level, and the first switching device T1 is turned off. The second gate signal line Gate 2 is input high level, and the second switching device T2 is turned on. The light-emitting intensity signal input from the data signal line 9 is transmitted to the gate electrode of the third switching device T3 through the second switching device T2, and the voltage is maintained due to the capacitance of the first charge storage device C1. In this process, the light-emitting signal line EM is input low level, the fourth switching device T4 is turned off, and the OLED does not emit light.

Subsequently, the light-emitting signal line EM is input high level, and current flows from ELVDD to ELVSS, so that the OLED is controlled to emit light according to the light-emitting intensity signal of the gate electrode of the third switching device T3.

In the above work process, the initialization phase is also included. The first charge storage device C1 receives the initialization signal, and the light-emitting intensity signal of the gate electrode of the initialized third switching device T3. If the sensor signal line (Sensor Line) 10 sends the pulse signal and the initialization signal at intervals, the other end of the first charge storage device C1 is electrically connected to the first node A. If the sensor signal line 10 sends the pulse signal and the initialization signal line sends the initialization signal, the other end of the first charge storage device C1 is electrically connected to the initialization signal line.

Similarly, applied to the circuit structure of the 4T1C in Embodiment 2, the drain electrode is connected to a high voltage and the source electrode is connected to a low voltage when each switching device TFT adopts N-type MOS.

The fifth terminal of the gray-scale control circuit 2 is connected to the initialization signal line, the first terminal of the sensing circuit 1 receives the second level signal, the sensing circuit 1 is turned off, and the fifth terminal of the gray-scale control circuit 2 receives the initialization signal to initialize the light-emitting intensity signal.

In the above work process, fingerprint recognition and OLED light-emitting are in time-sharing control, a part of the time is fingerprint recognition time, and another part of the time is display time.

Figure 12:
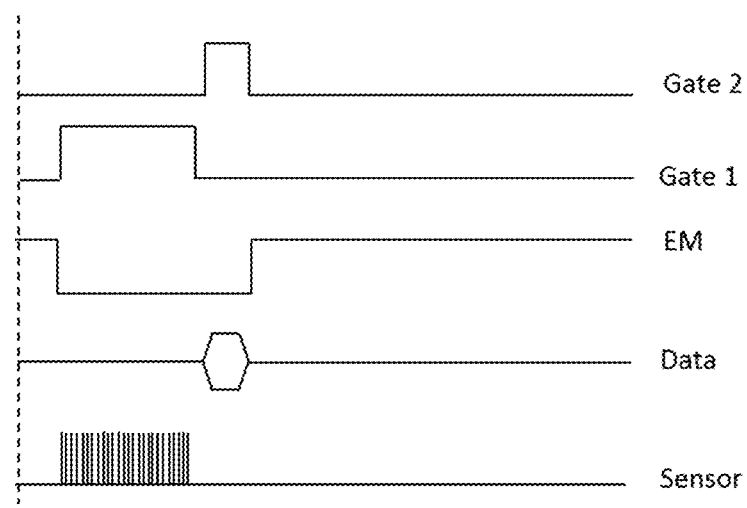
FIG. 12 is another timing diagram of a driving method of a pixel circuit according to Embodiment 1 of the present application, in which time for the signal input of Gate1 becomes longer, and time for fingerprint recognition is extended.

As shown in FIG. 12, if the sensitivity of fingerprint recognition is considered to be improved, the timing may be adjusted by extending the high-level time of the first gate signal line Gate 1, and by correspondingly extending the low-level time of the light-emitting signal line EM and the sensor signal line (Sensor Line) 10 detection time, so that the high-level time of the light-emitting signal line EM is correspondingly shortened, the light-emitting time is reduced, and the fingerprint recognition time is extended, which increases the accuracy of fingerprint recognition. However, at the expense of the corresponding light emission time, the light emission brightness will be dimmed. Therefore, the time-sharing ratio of fingerprint recognition and display may be determined according to the actual signal-to-noise ratio after the display screen is made. At the same time, it can also be driven by considering dynamic adjustment. When fingerprint recognition is required, the corresponding time of fingerprint recognition is extended. When fingerprint recognition is not required, the display time is increased to achieve high-brightness display. When low brightness is required, the OLED may reduce the corresponding current density, so that a small current is used for driving during the ordinary display to achieve a relatively high display life.

Embodiment 8

In this embodiment, the pixel driving method includes the following steps:

Initialization Phase:

the first terminal of the gray-scale control circuit 2 receives a second level signal, and the second and fifth terminals of the gray-scale control circuit 2 are turned off;

the first terminal of the sensing circuit 1 receives the second level signal, and the sensing circuit 1 is turned off;

the first terminal of the light-emitting switch circuit 3 receives the second level signal, and the light-emitting switch circuit 3 is turned off;

when the fourth terminal of the gray-scale control circuit 2 receives the first level signal, the fourth terminal of the gray-scale control circuit 2 and the fifth terminal of the gray-scale control circuit 2 are turned on, and the fourth terminal of the gray-scale control circuit 2 receives the initialization signal, to initialize the light-emitting intensity signal of the gray-scale control circuit 2;

Fingerprint Recognition Phase:

the light-emitting switch circuit 3 remains off;

the fourth terminal of the gray-scale control circuit 2 receives the second level signal, and the fourth terminal of the gray-scale control circuit 2 and the fifth terminal of the gray-scale control circuit 2 are disconnected; and when the first terminal of the sensing circuit 1 receives the first level signal, the pulse signal received by the second terminal of the sensing circuit 1 is output to the anode layer 6 of the OLED through the third terminal of the sensing circuit 1, and the sensing capacitor which is formed by the anode layer 6 of the OLED and the touch object is continuously charged and discharged.

Light-Emitting Intensity Control Phase:

the light-emitting switch circuit 3 remains off;

the fourth terminal of the gray-scale control circuit 2 receives the second level signal, and the fourth terminal of the gray-scale control circuit 2 and the fifth terminal of the gray-scale control circuit 2 are disconnected; and when the first terminal of the gray-scale control circuit 2 receives the first level signal, the second terminal of the gray-scale control circuit 2 and the fifth terminal of the gray-scale control circuit 2 are turned on, and the received light-emitting intensity signal of the data signal line 9 is transmitted to the gray-scale control circuit 2 by the second terminal of the gray-scale control circuit 2 and stored.

Light-Emitting Phase:

the first terminal of the sensing circuit 1 receives the second level signal, and the sensing circuit 1 is turned off;

the fourth terminal of the gray-scale control circuit 2 receives the second level signal, and the fourth terminal of the gray-scale control circuit 2 and the fifth terminal of the gray-scale control circuit 2 are disconnected;

the first terminal of the gray-scale control circuit 2 receives the second level signal, and the second terminal of the gray-scale control circuit 2 and the fifth terminal of the gray-scale control circuit 2 are disconnected;

the light-emitting switch circuit 3 is turned on when receiving the first level signal through the first terminal, and the driving current corresponding to the light-emitting intensity signal is transmitted to the anode layer 6 of the OLED, and the OLED emits light.

Figure 13:
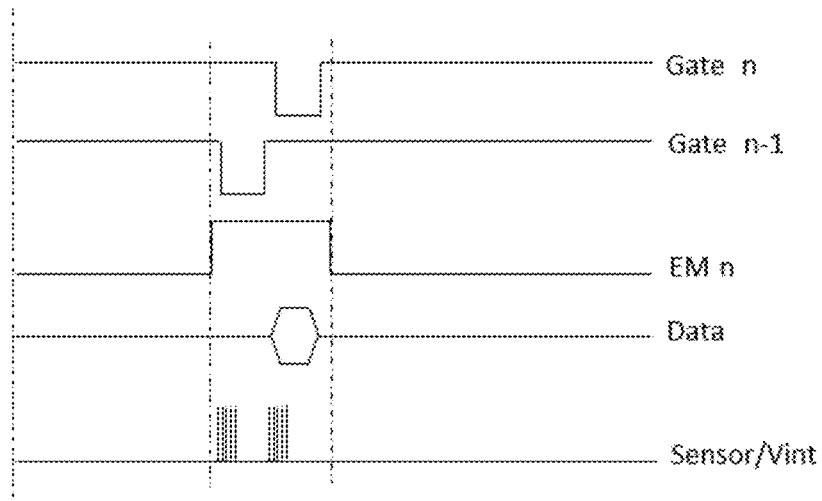
FIG. 13 is a timing diagram of a driving method of a pixel circuit according to Embodiment 3 of the present application.

As shown in FIG. 13, the driving method of the present application is applied to the circuit structure of the 7T1C in Embodiment 3, wherein the drain electrode is connected to a low voltage and the source electrode is connected to a high voltage when each switching device TFT adopts P-type MOS.

The specific work process is performed according to the following sequence:

First, when Gate n−1 is at a low level, the nine switching device T9 is turned on, the sensor signal line 10 (Sensor Line) 10 is communicated with gate electrode of the seventh switching device T7 and the first charge storage device C2 through the ninth switching device T9, and the signal of the sensor signal line 10 (Sensor Line) 10 is written. The signal of the Sensor Line is the sensor signal (i.e., the pulse signal) during a part of time and Vint voltage (i.e., the initialization signal) during another part of time as shown in the drawing. In each unit time, the sensor signal line (Sensor Line) 10 outputs the initialization signal to the gate electrode of the seventh switching device T7 through the ninth switching device T9 via the fifth node E.

Then, Gate n−1 is high level, the ninth switching device T9 is turned off. The sixth switching device T6, the eighth switching device T8, and the fifth switching device T5 are turned on with the Gate n input low level, and the data signal line Data Line writes the light-emitting intensity signal to the gate electrode of the seventh switching device T7 through the sixth switching device T6, the seventh switching device T7, and the eight switching device T8. The voltage is maintained due to the capacitance of the first charge storage device C2. In this process, the light-emitting signal line EM is input high level and is in the off state, and the OLED does not emit light. The anode layer 6 of the OLED is used as one end of capacitive sensing to perform fingerprint recognition detection. In this process, one end of the sensor signal line (Sensor Line) 10 is connected to the drive circuit, and the pulse signal is sent through the fifth switching device T5 for fingerprint recognition sensing. The light-emitting signal line EMn remains the input of high level, and the eleventh switching device T11 and the tenth switching device T10 are turned off to ensure that the OLED does not emit light.

Subsequently, the light-emitting signal line EMn is input low level, and current flows from ELVDD to ELVSS, so that the OLED is controlled to emit light according to the light-emission intensity signal of the gate electrode of the seventh switching device T7.

Figure 14:
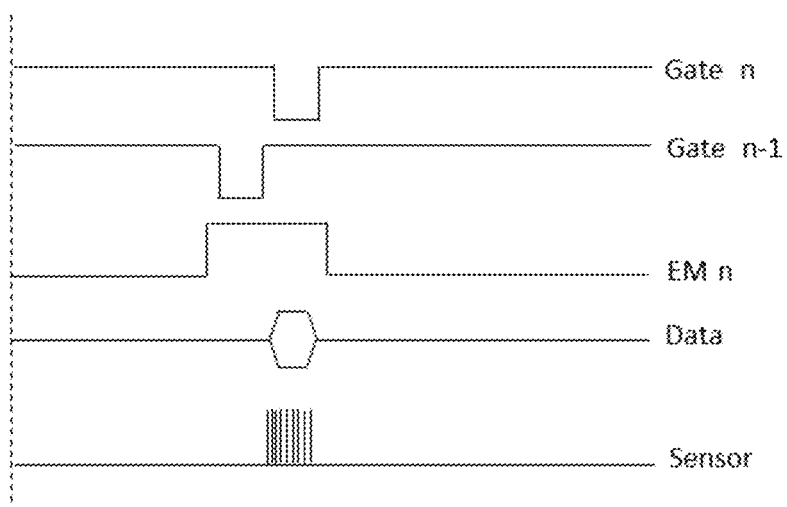
FIG. 14 is a timing diagram of a driving method of a pixel circuit according to Embodiment 4 of the present application.

As shown in FIG. 14, the driving method of the present application is applied to the 7T1C circuit structure of the Embodiment 4. The timing of the specific work process is similar to the timing in FIG. 11. The difference is that the initialization signal line Vint Line sends the initialization signal and the sensor signal line (Sensor Line) 10 sends the pulse signal.

When Gaten−1 is at a low level, the ninth switching device T9 is turned on, and the initialization signal line Vint Line communicates with the gate electrode of the seventh switching device T7 and one end of the first charge storage device C2 through the ninth switching device T9, and the initialization signal line Vint Line outputs the initialization signal to the gate electrode of the seventh switching device T7 through the ninth switching device T9 via the fifth node E.

Figure 15:
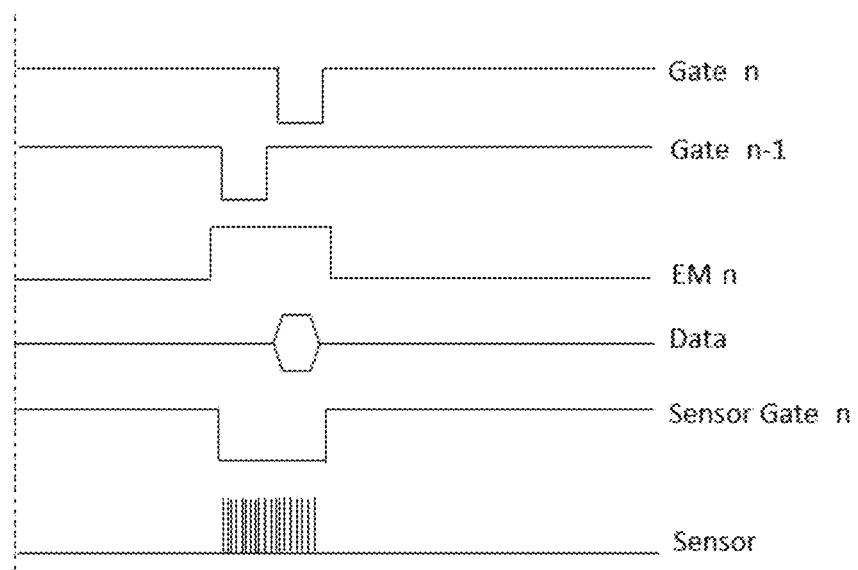
FIG. 15 is a timing diagram of a driving method of a pixel circuit according to Embodiment 6 of the present application.

As shown in FIG. 15, the driving method of the present application is applied to the circuit structure of 7T1C in Embodiment 6. The first terminal of the sensing circuit 1 is electrically connected to the n-th pulse signal line sensor Gate n, and the first terminal of the gray-scale control circuit 2 is electrically connected to the n-th gate signal line Gate n.

Similarly, the first terminal of the sensing circuit 1 and the first terminal of the gray-scale control circuit 2 are connected to different signal lines, and the fingerprint recognition phase and the light-emitting intensity control phase are performed separately, so that the time for inputting the pulse signal by the Sensor Gate n signal line may be controlled separately, which is convenient to extend the sensing time and increase the accuracy of sensing.

Similarly, the driving method of the Embodiment 5 is similar to that of Embodiment 3, except that the first terminal of the sensing circuit 1 and the first terminal of the gray-scale control circuit 2 are connected to different signal lines, and the fingerprint identification phase and the light-emitting intensity control phase are performed separately.

Those skilled in the art may understand that the various operations, methods, steps, measures, and solutions in the process that have been discussed in the application can be alternated, modified, combined, or deleted. Further, the various operations, methods, and other steps, measures, and solutions in the process that have been discussed in the application can also be alternated, modified, rearranged, decomposed, combined, or deleted. Further, steps, measures, and solutions in the prior art that have various operations, methods, and processes disclosed in this application can also be alternated, modified, rearranged, decomposed, combined, or deleted.

The terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, unless otherwise stated, "a plurality of" means two or more. "Comprising" or "including" and similar words mean that the elements or objects appearing after the words encompass the elements or objects appearing before the words and its equivalents without excluding other elements or objects. Words such as "connected" or "connecting" are not limited to physical or mechanical connections, but may include electrical connections, whether direct or indirect. "On", "under", "left", "right", and the like, are only used to indicate the relative position relationship. When the absolute position of the described object changes, the relative position relationship may also change accordingly. When an element such as a layer, film, region, or substrate is referred to as being "on" or "under" another element, it can be "directly on" or "under" the another element, or an intervening element may be present.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they can be performed in other orders. Moreover, at least a part of the steps in the flowchart of the drawings may include multiple sub-steps or multiple stages. These sub-steps or stages are not necessarily performed at the same time, but may be performed at different times. It is not necessarily performed sequentially, but may be performed in turn or alternately with other steps or at least a part of the sub-steps or stages of other steps.

The above description contains the preferred embodiments of the present application. It should be noted that, for those of ordinary skill in the art, without departing from the principles described in the present application, several improvements and modifications, which should be regarded as within the scope of the application, may be made.

The above description is only part of the embodiments of the present application. It should be noted that, for those of ordinary skill in the art, without departing from the principles of the present application, several improvements and modifications, which should be regarded as within the scope of the application, may be made.

What is claimed is:

1. A pixel circuit, disposed in an Organic Light-Emitting Diode (OLED) display device, comprising: a sensing circuit, a gray-scale control circuit and a light-emitting switch circuit;
    wherein the sensing circuit is electrically connected to a sensor signal line and an anode layer of the OLED and charges and discharges the sensing capacitor when a sensing capacitor is formed by a touch object and the anode layer of the OLED;
    the gray-scale control circuit is configured to control light-emitting intensity of the OLED, and comprises a first terminal electrically connected to a gate signal line, a second terminal electrically connected to a data signal line, a third terminal electrically connected to the anode layer of the OLED, a fourth terminal electrically connected to the light-emitting switch circuit, and a fifth terminal electrically connected to an initialization signal line;

the light-emitting switch circuit is electrically connected to a light-emitting signal line and the anode layer of the OLED, and controls the OLED to emit light; and the gray-scale control circuit is electrically connected to the light-emitting switch circuit, and the gray-scale control circuit is configured to control the light-emitting intensity of the OLED when the light-emitting switch circuit controls the OLED to emit light, wherein in a fingerprint recognition phase, the sensing circuit is turned on, a pulse signal is received, and the sensing capacitor formed by the anode layer of the OLED and the touch object is charged and discharged; in a light-emitting intensity control phase, a light-emitting intensity signal is received, and the light intensity signal is input to the gray-scale control circuit for storage; in a light-emitting phase, a light-emitting signal is received, and the light-emitting switch circuit is turned on, causing the gray-scale control circuit to control the OLED to emit light according to the light-emitting intensity signal, and in an initialization phase, the gray-scale control circuit receives an initialization signal and initializes the light-emitting intensity signal of the gray-scale control circuit, wherein in the fingerprint recognition phase: the gray-scale control circuit and the light-emitting switch circuit are turned off when receiving a second level signal through their respective first terminals; the sensing circuit is turned on when receiving a first level signal through a first terminal of the sensing circuit, outputting the pulse signal received by a second terminal of the sensing circuit to the anode layer of the OLED through a third terminal of the sensing circuit, so as to charge and discharge the sensing capacitor formed by the anode layer of the OLED and the touch object; and in the light-emitting intensity control phase: the sensing circuit is turned off when receiving a second level signal through the first terminal of the sensing circuit; the light-emitting switch circuit remains in off state; when the gray-scale control circuit receives the first level signal through the first terminal of the gray-scale control circuit, the second terminal and the fifth terminal of the gray-scale control circuit are conducting; and the second terminal of the gray-scale control circuit transmits the received light-emitting intensity signal of the data signal line to the gray-scale control circuit for storage, or, in the fingerprint recognition phase: the first terminal of the gray-scale control circuit receives a second level signal, and the light-emitting switch circuit is turned off; the fourth terminal of the gray-scale control circuit receives the second level signal, and the fourth terminal of the gray-scale control circuit and the fifth terminal of the gray-scale control circuit are non-conducting; when a first terminal of the sensing circuit receives a first level signal, the pulse signal received by a second terminal of the sensing circuit is output to the anode layer of the OLED through a third terminal of the sensing circuit, so as to charge and discharge the sensing capacitor formed by the anode layer of the OLED and the touch object; and in the light-emitting intensity control phase: the light-emitting switch circuit remains in off state; the fourth terminal of the gray-scale control circuit receives the second level signal, and the fourth terminal of the gray-scale control circuit and the fifth terminal of the gray-scale control circuit are non-conducting; when the first terminal of the gray-scale control circuit receives the first level signal, the second terminal of the gray-scale control circuit and the fifth terminal of the gray-scale control circuit are conducting, and the second terminal of the gray-scale control circuit transmits the received light-emitting intensity signal of the data signal line to the gray-scale control circuit for storage.

2. The pixel circuit according to claim 1, wherein a first terminal, a second terminal, and a third terminal of the sensing circuit are electrically connected to an (n−1)-th gate signal line, the sensor signal line, and the anode layer of the OLED, respectively, where n is an integer and n>1;

a cathode layer of the OLED is electrically connected to a first voltage terminal;

the sensor signal line sends a pulse signal and the initialization signal line sends an initialization signal;

a first terminal of the light-emitting switch circuit is electrically connected to the light-emitting signal line; and a second terminal and a third terminal of the light-emitting switch circuit are electrically connected to the fourth terminal of the gray-scale control circuit and a second voltage terminal, respectively.

3. The pixel circuit according to claim 2, wherein the sensing circuit comprises a first switching device;

a control electrode of the first switching device is used as the first terminal of the sensing circuit;

a first electrode and a second electrode of the first switching device are used as the second terminal and the third terminal of the sensing circuit, respectively; and the first electrode of the first switching device is externally connected to a driving circuit through the sensor signal line; and the driving circuit continuously sends pulse signal to the sensing capacitor formed by the anode layer of the OLED and the touch object through the sensor signal line when the first switching device is turned on.

4. The pixel circuit according to claim 3, wherein the gray-scale control circuit comprises a second switching device, a third switching device, and a first charge storage device;

a control electrode and a first electrode of the second switching device are used as the first terminal and the second terminal of the gray-scale control circuit, respectively;

a second electrode of the second switching device is electrically connected to a second node;

a first electrode of the third switching device is used as the fourth terminal of the gray-scale control circuit;

a control electrode of the third switching device is electrically connected to the second node;

one terminal of the first charge storage device is electrically connected to the second node; and a second electrode of the third switching device is used as the third terminal of the gray-scale control circuit, and another terminal of the first charge storage device is used as the fifth terminal of the gray-scale control circuit.

5. The pixel circuit according to claim 4, wherein the light-emitting switch circuit comprises a fourth switching device;
a control electrode of the fourth switching device is used as the first terminal of the light-emitting switch circuit; and
a first electrode and a second electrode of the fourth switching device are used as the second terminal and the third terminal of the light emitting switch circuit, respectively.

6. The pixel circuit according to claim 3, wherein each switching device is a thin film transistor, and the control electrode of any of the switching devices is a gate electrode of the thin film transistor;
the first electrode of the switching device is a source electrode of the thin film transistor, the second electrode of the switching device is a drain electrode of the thin film transistor; or
the first electrode of the switching device is the drain electrode of the thin film transistor, the second electrode of the switching device is the source electrode of the thin film transistor.

7. An Organic Light-Emitting Diode (OLED) display device, comprising an array substrate, a pixel circuit, a driving circuit and a plurality of pixel units,
wherein the pixel circuit comprises: a sensing circuit, a gray-scale control circuit and a light-emitting switch circuit;
the sensing circuit is electrically connected to a sensor signal line and an anode layer of the OLED and charges and discharges the sensing capacitor when a sensing capacitor is formed by a touch object and the anode layer of the OLED;
the gray-scale control circuit is configured to control light-emitting intensity of the OLED, and comprises a first terminal electrically connected to a gate signal line, a second terminal electrically connected to a data signal line, a third terminal electrically connected to the anode layer of the OLED, a fourth terminal electrically connected to the light-emitting switch circuit, and a fifth terminal electrically connected to an initialization signal line;
the light-emitting switch circuit is electrically connected to a light-emitting signal line and the anode layer of the OLED, and controls the OLED to emit light; and
the gray-scale control circuit is electrically connected to the light-emitting switch circuit, and the gray-scale control circuit controls the light-emitting intensity of the OLED when the light-emitting switch circuit controls the OLED to emit light,
the sensor signal line, the data signal line, and the light-emitting signal line are electrically connected to the driving circuit; and
the driving circuit sends a pulse signal through the sensor signal line for fingerprint recognition, sends a light-emitting intensity signal through the data signal line, and sends a light-emitting signal through the light-emitting signal line; and
when the pulse signal is received, the sensing capacitor formed by the touch object and the anode layer of the OLED in the pixel unit is detected,
wherein in a fingerprint recognition phase, the sensing circuit is turned on, a pulse signal is received, and the sensing capacitor formed by the anode layer of the OLED and the touch object is charged and discharged;
in a light-emitting intensity control phase, a light-emitting intensity signal is received, and the light intensity signal is input to the gray-scale control circuit for storage; in a light-emitting phase, a light-emitting signal is received, and the light-emitting switch circuit is turned on, causing the gray-scale control circuit to control the OLED to emit light according to the light-emitting intensity signal, and in an initialization phase, the gray-scale control circuit receives an initialization signal and initializes the light-emitting intensity signal of the gray-scale control circuit,
wherein
in the fingerprint recognition phase: the gray-scale control circuit and the light-emitting switch circuit are turned off when receiving a second level signal through their respective first terminals; the sensing circuit is turned on when receiving a first level signal through a first terminal of the sensing circuit, outputting the pulse signal received by a second terminal of the sensing circuit to the anode layer of the OLED through a third terminal of the sensing circuit, so as to charge and discharge the sensing capacitor formed by the anode layer of the OLED and the touch object; and in the light-emitting intensity control phase: the sensing circuit is turned off when receiving a second level signal through the first terminal of the sensing circuit; the light-emitting switch circuit remains in off state; when the gray-scale control circuit receives the first level signal through the first terminal of the gray-scale control circuit, the second terminal and the fifth terminal of the gray-scale control circuit are conducting; and the second terminal of the gray-scale control circuit transmits the received light-emitting intensity signal of the data signal line to the gray-scale control circuit for storage,
or, in the fingerprint recognition phase: the first terminal of the gray-scale control circuit receives a second level signal, and the light-emitting switch circuit is turned off; the fourth terminal of the gray-scale control circuit receives the second level signal, and the fourth terminal of the gray-scale control circuit and the fifth terminal of the gray-scale control circuit are non-conducting; when a first terminal of the sensing circuit receives a first level signal, the pulse signal received by a second terminal of the sensing circuit is output to the anode layer of the OLED through a third terminal of the sensing circuit, so as to charge and discharge the sensing capacitor formed by the anode layer of the OLED and the touch object; and in the light-emitting intensity control phase: the light-emitting switch circuit remains in off state; the fourth terminal of the gray-scale control circuit receives the second level signal, and the fourth terminal of the gray-scale control circuit and the fifth terminal of the gray-scale control circuit are non-conducting; when the first terminal of the gray-scale control circuit receives the first level signal, the second terminal of the gray-scale control circuit and the fifth terminal of the gray-scale control circuit are conducting, and the second terminal of the gray-scale control circuit transmits the received light-emitting intensity signal of the data signal line to the gray-scale control circuit for storage.

8. The display device according to claim 7, wherein each of the pixel units serves as a transmitting electrode or a receiving electrode; capacitance detection is achieved between the receiving electrode and the transmitting electrode of adjacent pixel units;

among adjacent pixel units, one row serves as the transmitting electrode and another row serves as the receiving electrode; or the number of receiving electrodes is twice the number of transmitting electrodes, and each transmitting electrode is surrounded by receiving electrodes.

9. The display device according to claim 7, wherein a first terminal, a second terminal, and a third terminal of the sensing circuit are electrically connected to an (n−1)-th gate signal line, the sensor signal line, and the anode layer of the OLED, respectively, where n is an integer and n>1;

a cathode layer of the OLED is electrically connected to a first voltage terminal;

the sensor signal line sends a pulse signal and the initialization signal line sends an initialization signal;

a first terminal of the light-emitting switch circuit is electrically connected to the light-emitting signal line; and a second terminal and a third terminal of the light-emitting switch circuit are electrically connected to the fourth terminal of the gray-scale control circuit and a second voltage terminal, respectively.

10. A pixel driving method, applied to a pixel circuit a sensing circuit, a gray-scale control circuit and a light-emitting switch circuit, wherein, the sensing circuit is electrically connected to a sensor signal line and an anode layer of the OLED and charges and discharges the sensing capacitor when a sensing capacitor is formed by a touch object and the anode layer of the OLED;

the gray-scale control circuit is configured to control light-emitting intensity of the OLED, and comprises a first terminal electrically connected to a gate signal line, a second terminal electrically connected to a data signal line, a third terminal electrically connected to the anode layer of the OLED, a fourth terminal electrically connected to the light-emitting switch circuit, and a fifth terminal electrically connected to an initialization signal line;

the light-emitting switch circuit is electrically connected to a light-emitting signal line and the anode layer of the OLED, and controls the OLED to emit light; and the gray-scale control circuit is electrically connected to the light-emitting switch circuit, and the gray-scale control circuit controls the light-emitting intensity of the OLED when the light-emitting switch circuit controls the OLED to emit light, and wherein the method comprises:

in a fingerprint recognition phase, turning on the sensing circuit, receiving a pulse signal, and charging and discharging the sensing capacitor formed by the anode layer of the OLED and the touch object;

in a light-emitting intensity control phase, receiving a light-emitting intensity signal, and inputting the light intensity signal to the gray-scale control circuit for storage; and in a light-emitting phase, receiving a light-emitting signal, and turning on the light-emitting switch circuit, causing the gray-scale control circuit to control the OLED to emit light according to the light-emitting intensity signal, wherein the method further comprises: in an initialization phase, receiving, by the gray-scale control circuit, an initialization signal, and initializing the light-emitting intensity signal of the gray-scale control circuit, wherein in the fingerprint recognition phase: the gray-scale control circuit and the light-emitting switch circuit are turned off when receiving a second level signal through their respective first terminals; the sensing circuit is turned on when receiving a first level signal through a first terminal of the sensing circuit, outputting the pulse signal received by a second terminal of the sensing circuit to the anode layer of the OLED through a third terminal of the sensing circuit, so as to charge and discharge the sensing capacitor formed by the anode layer of the OLED and the touch object; and in the light-emitting intensity control phase: the sensing circuit is turned off when receiving a second level signal through the first terminal of the sensing circuit; the light-emitting switch circuit remains in off state; when the gray-scale control circuit receives the first level signal through the first terminal of the gray-scale control circuit, the second terminal and the fifth terminal of the gray-scale control circuit are conducting; and the second terminal of the gray-scale control circuit transmits the received light-emitting intensity signal of the data signal line to the gray-scale control circuit for storage, or, in the fingerprint recognition phase: the first terminal of the gray-scale control circuit receives a second level signal, and the light-emitting switch circuit is turned off; the fourth terminal of the gray-scale control circuit receives the second level signal, and the fourth terminal of the gray-scale control circuit and the fifth terminal of the gray-scale control circuit are non-conducting; when a first terminal of the sensing circuit receives a first level signal, the pulse signal received by a second terminal of the sensing circuit is output to the anode layer of the OLED through a third terminal of the sensing circuit, so as to charge and discharge the sensing capacitor formed by the anode layer of the OLED and the touch object; and in the light-emitting intensity control phase: the light-emitting switch circuit remains in off state; the fourth terminal of the gray-scale control circuit receives the second level signal, and the fourth terminal of the gray-scale control circuit and the fifth terminal of the gray-scale control circuit are non-conducting; when the first terminal of the gray-scale control circuit receives the first level signal, the second terminal of the gray-scale control circuit and the fifth terminal of the gray-scale control circuit are conducting, and the second terminal of the gray-scale control circuit transmits the received light-emitting intensity signal of the data signal line to the gray-scale control circuit for storage.

\* \* \* \* \*